Nov. 30, 1965 G. I. ROBERTS 3,220,094
METHOD OF WINDING A STATOR
Original Filed July 3, 1958 9 Sheets-Sheet 1

FIG. 1

INVENTOR.
GEORGE I. ROBERTS
BY Herbert L. Davis
ATTORNEY

Nov. 30, 1965  G. I. ROBERTS  3,220,094
METHOD OF WINDING A STATOR
Original Filed July 3, 1958  9 Sheets-Sheet 3

FIG. 3

INVENTOR.
GEORGE I. ROBERTS
BY Herbert L. Davis
ATTORNEY

Nov. 30, 1965    G. I. ROBERTS    3,220,094
METHOD OF WINDING A STATOR
Original Filed July 3, 1958    9 Sheets-Sheet 4

INVENTOR.
GEORGE I. ROBERTS
BY
Herbert L. Davis
ATTORNEY

INVENTOR.
GEORGE I. ROBERTS
BY Herbert L. Davis
ATTORNEY

INVENTOR.
GEORGE I. ROBERTS
BY Herbert L. Davis
ATTORNEY

Nov. 30, 1965  G. I. ROBERTS  3,220,094
METHOD OF WINDING A STATOR
Original Filed July 3, 1958  9 Sheets-Sheet 7

FIG. 10

INVENTOR.
GEORGE I. ROBERTS
BY *Herbert L. Davis*
ATTORNEY

United States Patent Office 3,220,094
Patented Nov. 30, 1965

3,220,094
METHOD OF WINDING A STATOR
George I. Roberts, Maywood, N.J., assignor to The Bendix Corporation, a corporation of Delaware
Original application July 3, 1958, Ser. No. 746,437, now Patent No. 3,061,211, dated Oct. 30, 1962. Divided and this application July 25, 1960, Ser. No. 45,119
7 Claims. (Cl. 29—155.5)

The present application is a division of U. S. application Serial No. 746,437, filed July 3, 1958, now Patent No. 3,061,211, granted Oct. 30, 1962, by George I. Roberts, and assigned to Bendix Aviation Corporation. The invention relates to a novel coil winding process and more particularly to a novel method for winding field coils directly in slots of stator or rotor units for motors, generators, synchros or the like.

An object of the invention is to provide a novel coil winding method including the steps of passing winding wire through the bore of a stator or rotor unit; oscillating the unit relative to the wire so as to effect the necessary wire end turns on the unit; and picking up the wire from the opposite ends of the unit and selectively depositing the wire in end turn forming rings having inner and outer grooves. The end turn forming rings may be integral with the unit or may be of an expendible type such as disclosed and claimed in U.S. Patent No. 2,810,848, granted October 22, 1957, to George I. Roberts and assigned to Bendix Aviation Corporation.

Another object of the invention is to provide a novel method for automatically winding at the same time multiple field coils in the slots of the unit.

Another object of the invention is to provide a novel method of winding wire on end turn forming rings mounted at opposite ends of a stator or rotor unit and having inner and outer grooves, including the novel steps of depositing the wire in timed relation with the oscillation of the unit in such a manner as to wind coils first in one set of slots and then in another set of slots in the unit and first in the inner grooves and then in the outer grooves in the end turn forming rings.

Another object of the invention is to provide in the aforenoted method the additional step of oscillating the unit so as to meet the pitch requirements of the coils to be wound which may vary up to 200° or more, together with the additional step of varying the amount of oscillation so as to effect coils of different pitch.

Another object of the invention is to provide a novel method of winding coils on a stator or rotor unit including the steps of placing the wires of the coils in selected slots in the unit as required and in grooves of end turn forming rings so as to effectively wind coils of a predetermined pitch and coils which cross over each other at the ends thereof in a predetermined pattern.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Referring to the drawings of FIGURES 1 through 8, a typical coil winding apparatus in which the method of the invention may be applied is indicated generally by numeral 14 and includes a base plate 15 on which are mounted the necessary structures for operation of the several parts in accordance with the respective steps of the novel coil winding method. The apparatus may include a split bearing 17 for loading and unloading stator units for the coil winding process and a motor 19 for driving the gearing 21, counter unit 23 and coil winding apparatus indicated generally by the numeral 14.

The coil winding apparatus 14 may include suitable mechanism, not shown, such as a jaw tooth clutch of conventional type operated by a lever controlled by the counter unit 23 so as to automatically disconnect the motor 19 from driving relation with the coil winding apparatus and stop the apparatus after completion of a predetermined number of coil windings for which the counter unit 23 has been set or the disconnection of the motor 19 may be manually controlled by the operator through a lever 22 and the coil winding apparatus brought to a stop upon completion of the desired number of windings indicated by the counter unit 23.

Figure 3:
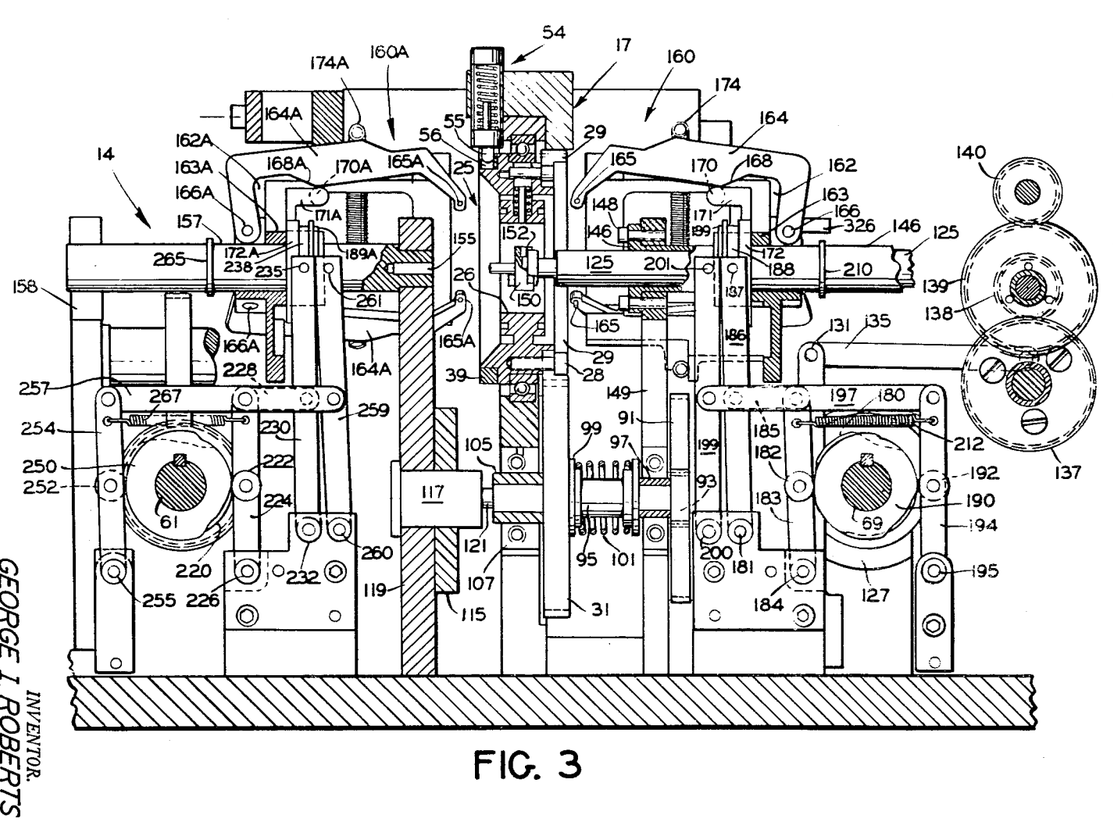
FIGURE 3 is an enlarged sectional view taken along the line 3—3 of FIGURE 1 and looking in the direction of the arrows.
Figure 4:
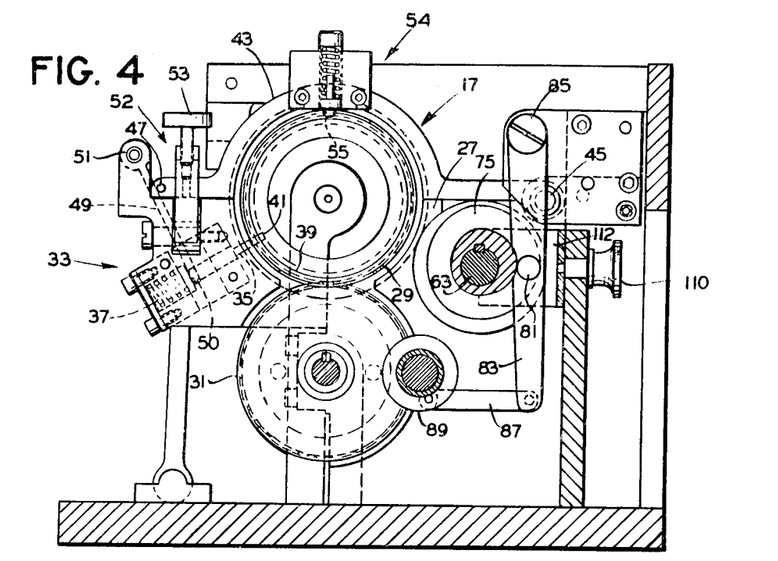
FIGURE 4 is an enlarged sectional view taken along the line 4—4 of FIGURE 1 and looking in the direction of the arrows.
Figure 8:
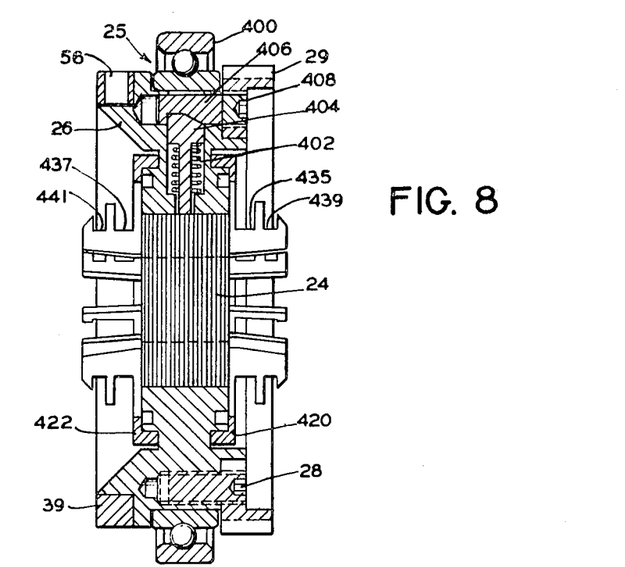
FIGURE 8 is an enlarged detail sectional view of the stator nest assembly with expendable end turn forming rings mounted at opposite ends of the stator.

A stator unit or shell 24 and stator nest assembly 25 are shown in detail in assembled relation in FIGURE 8, while as shown in detail in the coil winding apparatus of FIGURES 3 and 4, the stator nest assembly 25 is placed in a lower section 27 of the split bearing 17 and includes a stator nest member 26 to which there is secured by screws 28 a ring gear member 29. In order to effect proper alignment of the teeth of the ring gear 29 of the stator nest assembly 25 with teeth of a drive gear 31 and properly index the position of the teeth of the driven gear 29 with that of the driving gear 31 there is provided an alignment assembly 33, shown in FIGURE 4. The alignment assembly 33 is so arranged as to prohibit the gears 29 and 31 from meshing, except when the stator nest assembly 25 has been rotated to a proper index position with relation to the coil winding apparatus when loading.

The assembly 33 includes an alignment pin 35 biased by a spring element 37 against the periphery of an index collar 39. The index collar 39 includes a slot 41 cooperating with the alignment pin 35 and so arranged as not to allow the gears 29 and 31 to mesh until the slot 41 in the index collar 39 is adjusted to a predetermined position. This position is effected when the index collar 39 is so adjusted relative to the pin 35 as to allow the alignment pin 35 to enter the slot 41 at which time the driving gear 31 and the driven gear 29 are in mesh in the proper index position. The index collar 39 is secured to the stator nest member 26 by fastening elements 42, as shown in FIGURE 10.

The split bearing 17 has a cap portion 43 pivoted at 45 in an anti-clockwise direction to the closed position and includes a pin 47 in the bearing cap 43 arranged to operatively engage a lever 49 pivoted at one end at 51. An opposite end of the lever 49 is in operative contact with a flange portion 50 of the alignment pin 35 and so arranged as to act on the flange 50 so as to slide the alignment pin 35 out of engagement with the slot 41 upon closure of the bearing cap 43 and thereupon permit rotation of the stator nest 25 free of the alignment pin 35. The bearing cap 43 may be conveniently clamped and held in position by a hinged bracket 52 and thumb nut 53.

Figure 10:
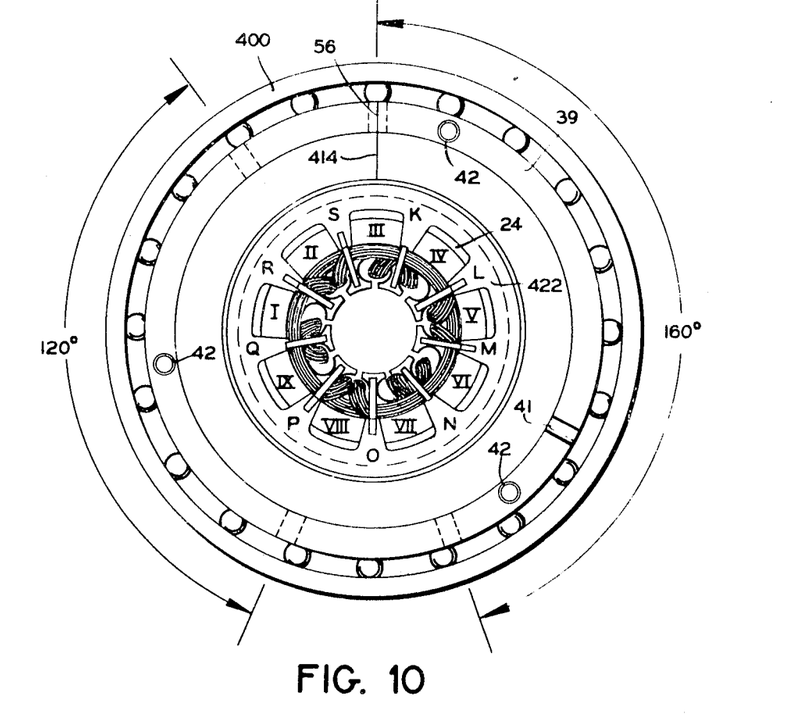
FIGURE 10 is an enlarged detail plan view of the left end of the stator nest assembly with an expendable end turn forming ring mounted at said end and six wound coils thereon in the completed stage.

A detent assembly 54, shown in FIGURES 3 and 4, is secured to the cap portion 43 and includes a spring biased detent element 55 cooperating with suitable openings 56 in the index collar 39 at the extreme 160 degree and 120 degree adjusted positions of the stator nest, as shown in FIGURE 10, so as to avoid misalignment of the stator nest assembly 25 due to lost motion between teeth of the gearing 29 and 31 and gear train 91–93, linkage 83–87 and play in cam roller 81.

Figure 1:
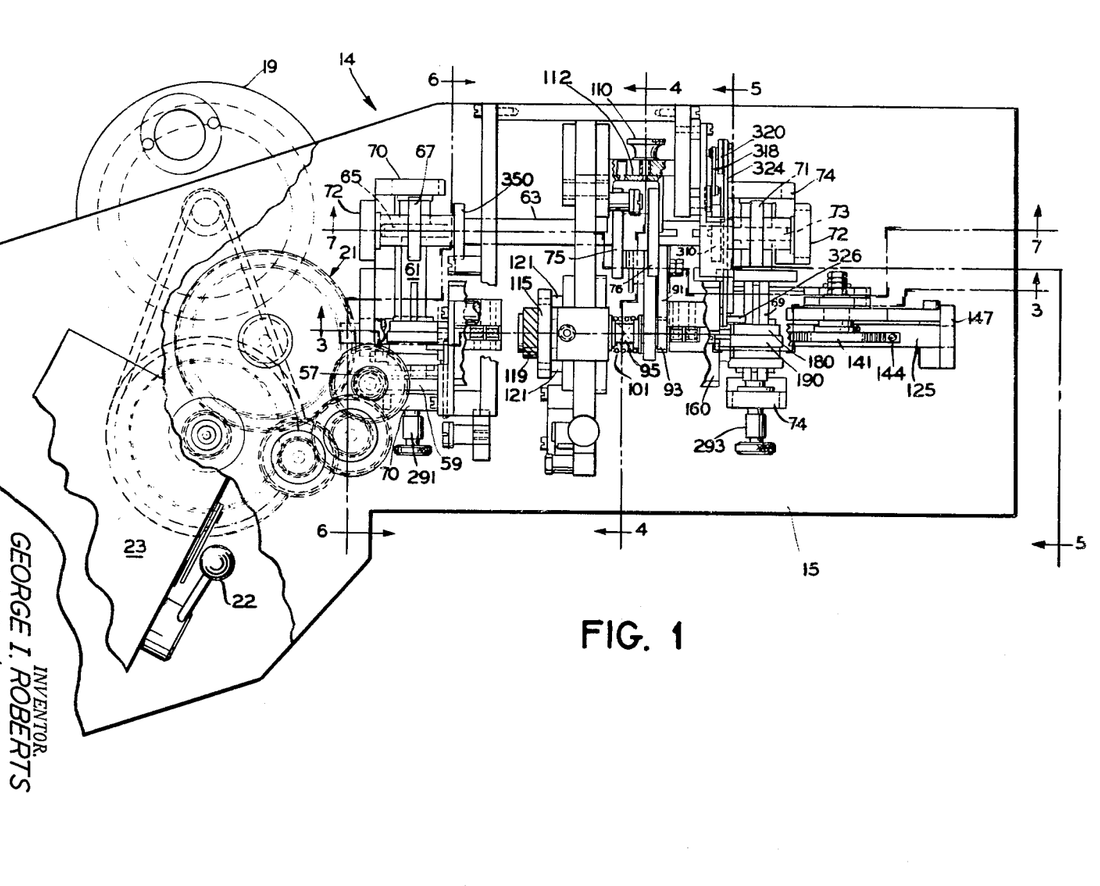
FIGURE 1 is a plan view of the coil winding apparatus with certain parts broken away to more clearly show the construction thereof.
Figure 2:
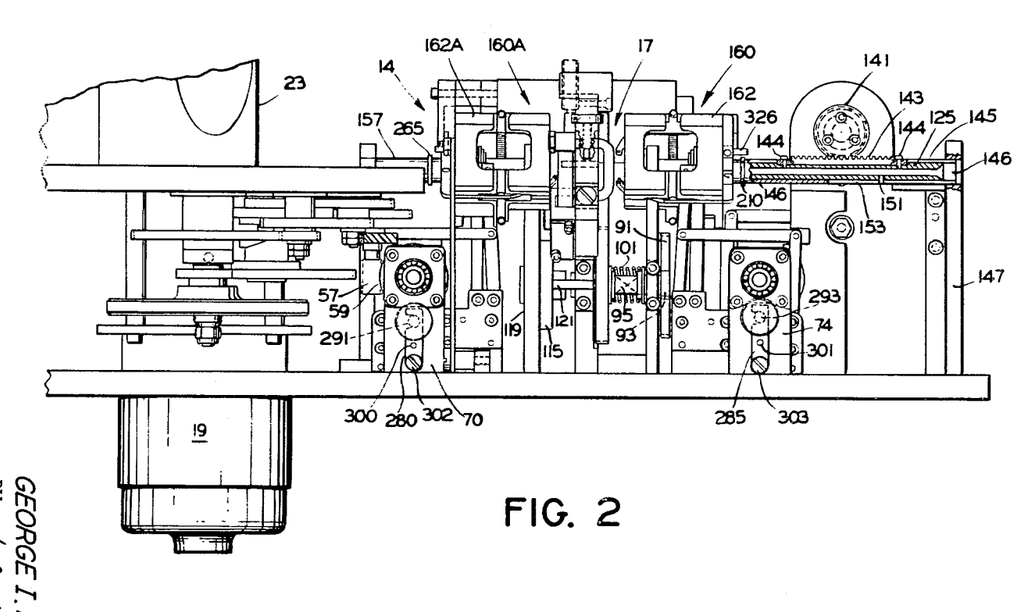
FIGURE 2 is a side elevation of the construction of FIGURE 1 with certain parts broken away to better illustrate the construction thereof.
Figure 7:
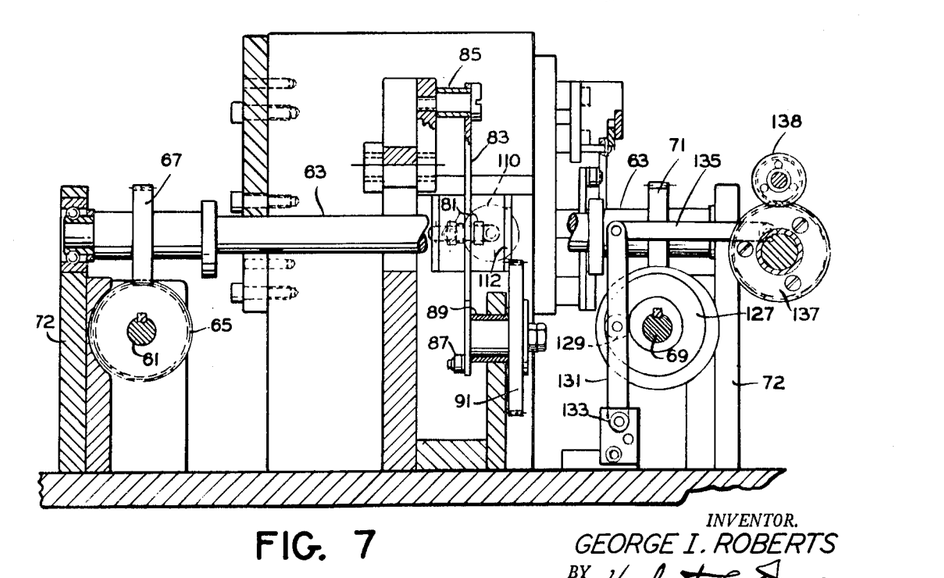
FIGURE 7 is an enlarged sectional view taken along the line 7—7 of FIGURE 1 and looking in the direction of the arrows.

As best shown in FIGURES 1 and 2, the coil winding apparatus is driven from the electric motor 19 through gearing 21 and worm gear 57 cooperating with gearing 59 so as to effect rotation of shaft 61. The shaft 61 in turn drives shaft 63 through helical gears 65 and 67, as shown in FIGURES 1 and 7, while shaft 63 drives a shaft 69 through helical gears 71 and 73. The three shafts 61, 63, and 69 are journaled in suitable roller bearings carried by supporting members 70, 72, and 74, as shown in FIGURES 1–2 and 7.

Functional component assemblies operated from the driven shafts 61, 63 and 69 include stator nest oscillation mcchanism, shuttle reciprocation mechanism and wire hook finger assemblies located at opposite sides of the stator nest assembly 25, as will be described hereinafter.

*Stator nest oscillation mechanism*

Figure 5:
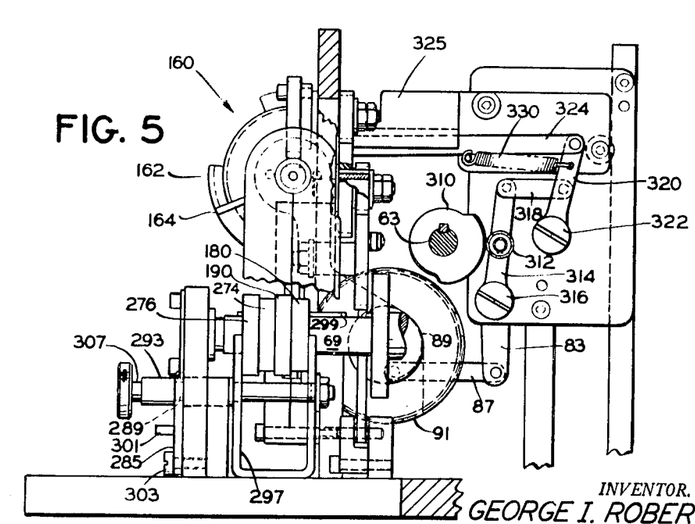
FIGURE 5 is an enlarged sectional view taken along the line 5—5 of FIGURE 1 and looking in the direction of the arrows.

The stator nest oscillation mechanism, as shown in FIGURES 1 and 4, includes cams 75 and 76 keyed to and axially slidable on the shaft 63. The cam 75 is a suitable track cam with a rise design to oscillate the stator nest assembly 25 for 160 degrees in each direction through suitable mechanical mechanism and is driven by the shaft 63, as best shown in FIGURE 4. The cam 75 contacts a roller 81 projecting from a lever 83 pivoted at 85 and connected by a link 87 so as to rotate gear stud 89 on which is assembled a gear 91, as shown in FIGURE 5, and which gear 91 meshes with a gear 93, as shown in FIGURES 1, 2 and 3, at a one to four step-up ratio.

The gear 93, as shown in FIGURE 3 is keyed to a shaft 95 on which is mounted bushing 97, spring retainer 99, spring 101, drive gear 31 and bushing 105. The spring retainer 99 and drive gear 31 are keyed to shaft 95 and the drive gear 31 is held in mesh with the stator nest gear 29 by spring 101. This assembly is journalled in split bearings 107, as shown in FIGURE 3.

As the cam 75 rotates, the stator nest 25 is rotated to exactly 160 degrees and then dwells a specified interval of time at the rotated position and thereafter is rotated back to the original position where it dwells again for the same dwell time. This operation is accomplished by means of the cam 75 through the linkages and gears, heretofore described, for winding the 160 degree coils, as will be hereinafter explained in greater detail.

In order to wind a second set of 120 degree coils, it is necessary to bring into operative relation the cam 76 in place of the cam 75 and disengage the stator nest driven gear 29 from the drive gear 31 so that the stator nest 25 may be rotated to a new index position for effecting the latter operation.

To change the track cam 75, there is provided a thumb nut 110, shown in FIGURES 1 and 4, which upon loosening permits a bracket 112 to be shifted to the left, as shown in FIGURE 1, so as to axially shift the cams on shaft 63 and place the second track cam 76 into contacting relation with the roller 81, while withdrawing the roller 81 from contacting relation with the cam 75. Upon such adjustment of the bracket 112, the thumb nut 110 may be tightenend so as to hold the bracket 112 and cam 76 in the readjusted position. The cam 76 is so arranged that through the cam linkages and gears previously described with reference to cam 75, the cam 76 may now operate so as to oscillate the stator nest assembly 25 over the second 120 degree range.

In order to rotate the stator nest assembly 25 to the new index position for winding the second set of 120 degree coils without rotating the drive gear 31, there is provided a knurled plate 115, shown in FIGURE 3, slidably mounted on a bearing member 117 carried by supporting member 119 and having pins 121 projecting from the plate 115 and so arranged that upon movement of the plate 115, as shown in FIGURES 1, 2 and 3, to the right, the pins 121 contact an adjacent face surface of the gear 31 and in turn move the gear 31 to the right against the tension of spring 101. The latter adjustment effectively disengages the drive gear 31 from mesh with the gear 29 so that the stator nest assembly 25 may thereupon be readjusted to a new index position for the second or 120 degree coil winding range.

Shuttle reciprocating motion

Motion of a shuttle 125, shown in FIGURE 2, is effected by means of a track cam 127, shown in FIGURE 7, keyed to the shaft 69 and contacting a roller 129 projecting from a lever 131 pivoted at 133 and connected by means of a link 135 to a gear 137. The motion imparted to gear 137 is transmitted through step-up ratio gear train 138, 139 and 140, as shown in FIGURES 1, 2 and 3, to a gear 141 which, as shown in FIGURE 2, meshes with a gear rack 143. The gear rack 143 is attached at 144 to the shuttle 125 and slidably mounted in a slot 145 provided in a bearing sleeve 146 so that the shuttle 125 may slide back and forth in the bearing sleeve 146 carried at one end by the supporting member 147 and secured at the opposite end at 148 to a supporting member 149.

Attached to the shuttle 125 at its innner end is a shuttle cap 150 having a plurality of wire slots or bushings 152. In the described apparatus there are three (3) wire slots 152 located 120 degrees apart. The shuttle 125, as shown in FIGURE 2, is keyed in the bearing sleeve 146 by a pin 151 slidable in a slot 153 so that there is no rotation of the shuttle cap 150.

Further, rotation of the track cam 127 (FIGURE 7) imparted by shaft 69 acts through the gear rack 143 (FIGURE 2) so as to slide the shuttle cap 150 (FIGURE 3) through the bore of the stator unit 24 (FIGURE 8) normally positioned in the stator nest assembly 25 and into contact with wall surfaces defining a hole 155 in a bearing member 157 carried by supporting members 119 and 158, as shown in FIGURE 3, so as to provide rigidity while shuttle 125 is stationary and the stator nest assembly is rotated. The shuttle cap 150 then returns through the stator nest to its position at the right of the stator nest assembly 25 where it again remains stationary until the stator nest assembly 25 has nearly completed its cycle of rotation, as hereinafter explained.

Wire hook finger assemblies and vertical and lateral motion thereof

Positioned at opposite sides of the stator nest assembly 25 are wire hook finger assemblies 160 and 160A, shown in FIGURES 2 and 3, and including housings 162 and 162A having inner bearing collars 163 and 163A, as shown in FIGURE 3, slidably mounted on bearing sleeve 146 and bearing member 157, respectively.

Mounted in the housings 162 and 162A are wire hook finger elements 164 and 164A (FIGURE 3) each of which has a wire hook pin element 165 or 165A at its free end while the opposite end thereof is pivotally connected at 166 or 166A to the respective housings. The respective fingers have cam surfaces 168 and 168A cooperating with roller elements 170 and 170A carried by arms 171 and 171A projecting from collars 172 and 172A slidably mounted on the bearing collars 163 and 163A within the housings 162 and 162A. Coiled spring members 174 and 174A surround the housings 162 and 162A and act on outer edge surfaces of the fingers to bias the wire hook fingers 164 and 164A into contacting relation with the respective rollers 170 and 170A.

A cam 180 (FIGURE 3) keyed to the shaft 69 controls vertical motion of the wire hook fingers 164 and the lateral position of the housing 162 only when being moved toward the stator nest assembly 25. In contact with the cam 180 is a roller 182 projecting from a lever 183 pivoted at 184. The lever 183 is connected by a link 185 to a bifurcated yoke lever 186 pivoted at 181. The bifurcated yoke portion of the lever 186 has provided at the free ends thereof pin portions 187 which project into an annular groove 188 provided in the collar 172 slidably mounted on the inner bearing collar 163 of the housing 162 so that the housing 162 is free to rotate on the bearing sleeve 146 and relative to the lever 186 while the lever 186 may effect an adjustment of the collar 172 within the housing 162 on collar 163 to cause a corresponding adjustment of the rollers 170 cooperating with the cam surface 168 of the fingers 164 to vertically adjust the fingers.

Thus, the control cam 180 cooperates through the described mechanism to elevate the fingers 164 to the position shown by the sliding of the roller elements 170 relative to the cam surfaces 168 and within the housing 162 toward the stator nest 25.

When the fingers 164 have reached the position shown in FIGURE 3, the collar 172 carrying the arms 171 and roller elements 170 makes contact with a lateral ring 189 positioned in the bearing collar 163 so that further increase of rise in cam 180 acts to move the housing 162 and the entire assembly 160 toward the stator nest 25 to a predetermined position.

The fingers 164 will remain in the elevated position, since there has been no change in the position of the roller elements 170 within the housing 162 and relative to the cam surfaces 168 of the fingers 164. The housing 162 is free to be moved in a lateral direction toward the stator nest 25 on the bearing sleeve 146 by the force exerted through the lever 186, collar 172, ring 189 and collar 163.

The lateral return motion of the housing 162 away from the stator nest 25 is effected by means of a control cam 190 affixed to shaft 69. In contact with the cam 190 is a roller 192 projecting from a lever 194 pivoted at 195. The lever 194 is connected by a link 197 to a bifurcated yoke lever 199 pivoted at 200. The bifurcated yoke portion of the lever 199 has provided at the free ends thereof pin portions 201 which operatively contact an end portion of the bearing collar 163 when the rise of cam 190 is in contact with roller 192.

Moreover, the control cams 180 and 190 are so designed that operation of the yoke lever 186 in motion of housing 162 away from the stator nest 25 precedes that of yoke lever 199 by approximately two (2) degrees, while in motion of housing 162 toward the stator nest 25, the yoke lever 199 precedes that of yoke lever 186 by the same approximate two (2) degrees. In such lateral adjustment there is no change in the elevation level of the fingers 164, since there has been no change in lateral relationship between the housing 162 and the roller elements 170 or in the relationship between the roller elements 170 and the cam surfaces 168 of the fingers 164.

In this connection when the cam roller 192 reaches the top of the rise on the control cam 190, the lateral motion of the housing 162 away from the stator nest assembly 25 is stopped by a retainer ring 210 mounted on the bearing sleeve 146. With the housing 162 in such lateral position, as shown in FIGURE 3, a further drop in the surface of the control cam 180 allows the fingers 164 to drop to a lower position, since the roller element 170 is then moved within the housing 162 in a direction away from the stator nest assembly 25 through the action of the bifurcated yoke lever 186 in controlling the position of the collar 172 on the sleeve 163.

The position of the fingers 164 is now such that when the housing 162 is rotated as hereinafter explained, the pins 165 of the three fingers 164 will be positioned under three separate wire strands and ready to pick up the wires in the coil winding operation, as will be explained hereinafter under the heading "Description of Operation" with reference to FIGURES 11A to C and 12A to E. The rollers 182 and 192 of the levers 183 and 194 are maintained in contact with the respective control cams 180 and 190 by means of a spring 212 connected at opposite ends to the levers 183 and 194, as shown in FIGURE 3.

In order to control the operation of the wire hook finger assembly 160A at the opposite side of the stator nest 25, there is provided a cam 220 keyed to shaft 61. The cam 220 controls vertical motion of the wire hook fingers 164A and the lateral position of the housing 162A only when the housing 162A is being moved toward the stator nest assembly 25.

In order to effect the foregoing operation, there is provided in contact with the cam 220 a roller 222 projecting from a lever 224 pivoted at 226. The lever 224 is connected by a link 228 to a bifurcated yoke lever 230 pivoted at 232. The bifurcated yoke portion of the lever 230 has provided at the free ends thereof pin portions 235 which project into an annular groove 238 provided in the collar 172A slidably mounted on the inner bearing collar 163A of the housing 162A so that the housing 162A is free to rotate on the bearing member 157 and relative to the lever 230, while the lever 230 may effect an adjustment of the collar 172A within the housing 162A on collar 163A to cause a corresponding adjustment of the rollers 170A cooperating with the cam surface 168A of the fingers 164A to vertically adjust the fingers.

Thus, the control cam 220 cooperates through the described mechanism to elevate the fingers 164A to the position shown by the sliding of the roller elements 170A relative to the cam surfaces 168A and within the housing 162A toward the stator nest 25.

When the fingers 164A have reached the position shown in FIGURE 3, the collar 172A carrying arms 171A and roller elements 170A makes contact with a lateral ring 189A positioned in the bearing collar 163A so that further increase of the rise in cam 220 acts to move the housing 162A and the entire assembly 160A toward the stator nest 25 to a predetermined position.

The fingers 164A will remain in the elevated position, since there has been no change in the position of the roller elements 170A within the housing 162A and relative to the cam surfaces 168A of the fingers 164A. The housing 162A is free to move in a lateral direction toward the stator nest 25 on the bearing member 157 by the force exerted through the lever 230, collar 172A, ring 189A and collar 163A.

The lateral return motion of the housing 162A away from the stator nest 25 is effected by means of a control cam 250 also affixed to shaft 61. In contact with the cam 250 is a roller element 252 projecting from a lever 254 pivoted at 255. The lever 254 is connected by a link 257 to a bifurcated yoke lever 259 pivoted at 260. The bifurcated yoke portion of the lever 259 has provided at the free ends thereof pin portions 261 which operatively contact an end portion of the bearing collar 163A when the rise of cam 250 is in contact with roller 252.

Moreover, the control cams 220 and 250 are so designed that operation of the yoke lever 230 of housing 162A away from the stator nest 25 precedes that of yoke lever 259 by approximately two (2) degrees, while in movement of the housing 162A toward the stator nest 25 the yoke lever 259 precedes that of yoke lever 230 by the approximate two (2) degrees. In such lateral adjustment there is no change in the elevation level of fingers 164A, since there has been no change in lateral relationship between the housing 162A and the roller elements 170A or in the relationship between the roller elements 170A and the cam surfaces 168A of the fingers 164A.

In this connection when the cam roller 252 reaches the top of the rise on the control cam 250 the lateral motion of the housing 162A away from the stator nest assembly 25 is stopped by a retainer ring 265 mounted on the bearing member 157. With the housing 162A in such lateral position, as shown in FIGURE 3, a further drop in the surface of the control cam 220 allows the fingers 164A to drop to a lower position, since the roller element 170A is then moved within the housing 162A in a direction away from the stator nest assembly 25 through the action of the bifurcated yoke lever 230 in controlling the position of the collar 172A on the sleeve 163A.

The position of the fingers 164A is now such that when the housing 162A is rotated, as hereinafter explained, the pins 165A of the three fingers 164A will be positioned under three separate wire strands and ready to pick up the wires in the coil winding operation as will be explained later under the heading "Description of Operation" with reference to FIGURES 11A to C and 12A to E. The rollers 222 and 252 of the levers 224 and 254 are maintained in contact with the respective control cams 220 and 250 by means of a spring 267 connected at opposite ends to the levers 224 and 254, as shown in FIGURE 3.

Figure 9:
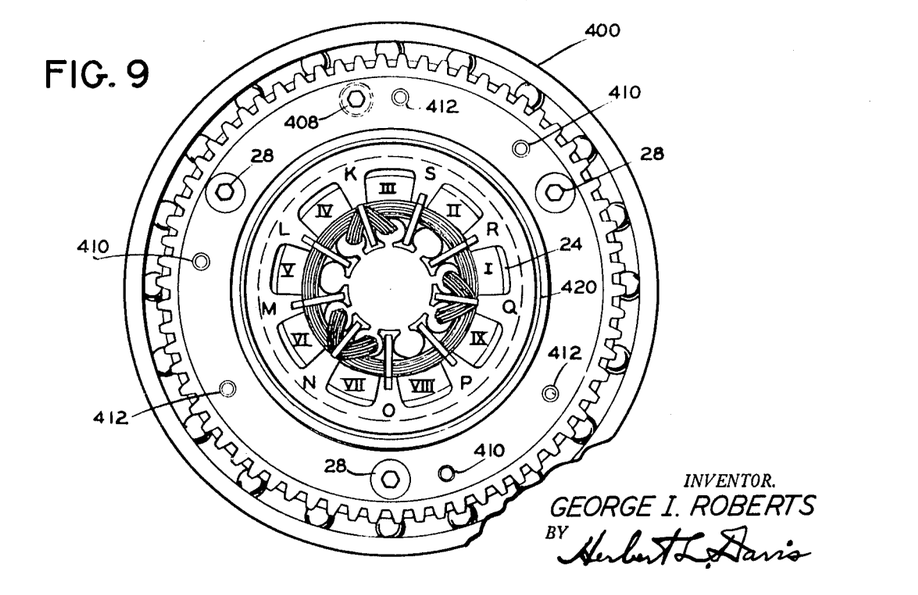
FIGURE 9 is an enlarged detail plan view of the right end of the stator nest assembly with an expendable end turn forming ring mounted at said end and three wound coils thereon.

The above descriptions with reference to the wire hook finger assemblies covers the operative parts in the vertical and lateral motion of the fingers in the winding of the first three crossover coils, shown in FIGURE 9, within the first predetermined range of, for example, 160 degrees. In order to wind the second set of three coils, shown in FIGURE 10, within a different range of, for example, 120 degrees, it is necessary to change the control cams which effect the movement of the wire hook assemblies in the lateral direction.

In the present mechanism, therefore, there is provided novel means for replacing the control cams 220 and 250 on the left side and the control cams 180 and 190 on the right side of the mechanism, as shown in FIGURE 3, by control cams 270 and 272 (FIGURE 6) and by control cams 274 and 276 (FIGURE 5), respectively.

Figure 6:
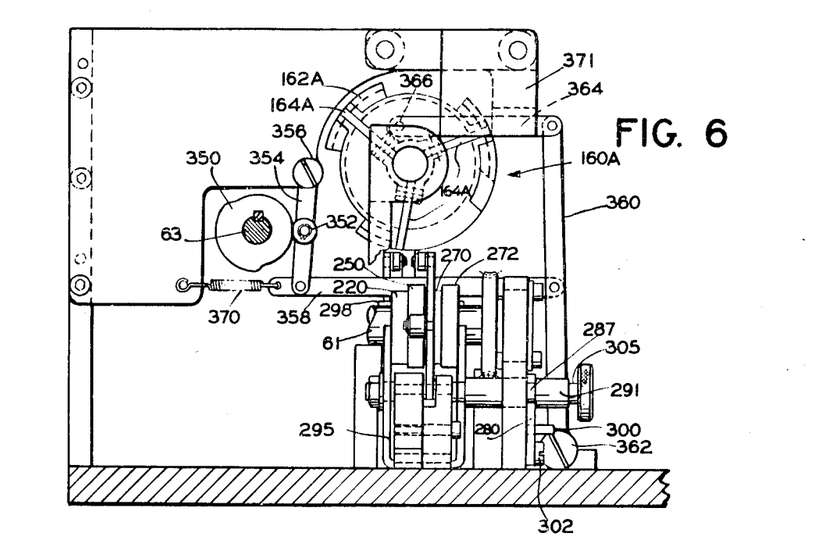
FIGURE 6 is an enlarged sectional view taken along the line 6—6 of FIGURE 1 and looking in the direction of the arrows.

In the latter mechanism there is provided latch members 280 and 285, as shown in FIGURES 2, 5 and 6, arranged to engage in channels 287 and 289 provided in actuating rods 291 and 293, respectively. The actuating rods 291 and 293 in turn serve to adjustably position brackets 295 and 297 between which are positioned, respectively, the control cams 220, 250, 270, 272 and the control cams 180, 190, 274 and 276 axially slidable on and splined at 298 and 299 to the shafts 61 and 69, respectively.

The latch members 280 and 285 may be pivotally adjusted on pivot pins 302 and 303 out of engagement with the channels 287 and 289 upon movement of latch members on pins 300 and 301 whereupon actuating rods 291 and 293 may be pushed inward toward the rear of the machine and the latch members 280 and 285 brought into locking engagement with the channels 305 and 307 of the actuating rods 291 and 293, respectively.

In the latter adjusted position of the actuating rods 291 and 293 the control cams 220 and 250 are replaced axially in operative relation by control cams 270 and 272 and control cams 180 and 190 are replaced axially in operative relation by control cams 274 and 276. The control cams 270, 272, 274 and 276 thereupon operate through the linkages previously described to change the lateral position of the wire hook lever assemblies 160 and 160A, to effect the desired operation thereof for winding the second set of three coils within a different predetermined range of, for example, 120 degrees.

*Rotation of wire hook finger assembly*

Rotation of the wire hook finger assembly 160 on the bearing sleeve 146 and rotation of the wire hook finger assembly 160A on bearing member 157 is effected through mechanism hereinafter described to provide the desired winding operation.

The rotation of housing 162 is effected by a cam 310 mounted on shaft 63 and shown in FIGURES 1 and 5. In contact with the cam 310 is a roller element 312 which, as shown in FIGURE 5, projects from a lever 314 pivoted at 316 connected by link 318 through another lever 320 pivoted at 322. The lever 320 has attached to it a link 324 which is in turn operably connected to a pin 326 of the wire hook finger assembly 160, as shown in FIGURE 1. A spring 330 biases the lever 320 in a counterclockwise direction and the finger assembly 160 in a counterclockwise direction while tending to maintain the roller 312 in contacting relation with the surface of the cam 310.

The function of the cam 310 is to rotate, through the linkage described, assembly 160 containing the wire hook fingers 164. Rotation of the finger assembly 160 in a counterclockwise direction rotates the fingers 164 and thereby the wire hook pin elements 165 away from the wire being wound through the stator slot, while rotation of the assembly 160 in a clockwise direction rotates the fingers 164 and thereby the wire hook pin elements 165 to a position under the wire after the shuttle 125 has reached its extreme right position. This operation will be explained more in detail later with reference to FIGURES 11A to C and 12A to E.

The bearing for rotation of the assembly 160 is the bearing sleeve 146, while the link 324 is supported in a groove in a mounting plate 325 so as to allow for smooth lateral operation of the wire hook finger assembly 160. The actuating pin 326 is slidably mounted in a hole at one end of the link 324 to permit the lateral operation of the wire hook finger assembly 160.

Similarly the rotation of housing 162A is effected by cam 350 mounted on shaft 63 and shown in FIGURES 1 and 6. In contact with the cam 350 is a roller element 352 which, as shown in FIGURE 6, projects from a lever 354 pivoted at 356 and connected by a link 358 to another lever 360 pivoted at 362. The lever 360 has attached to it a link 364 which is in turn operably connected to a pin 366 of the wire hook finger assembly 160A, as shown in FIGURE 6. A spring 370 biases the lever 360 in a counterclockwise direction and the finger assembly 160A in a counterclockwise direction, while tending to maintain the roller 352 in contacting relation with the surface of the cam 350.

The function of the cam 350 is to rotate through the linkages described, assembly 160A containing the wire hook fingers 164A. Rotation of the finger assembly 160A in a counterclockwise direction rotates the fingers 164A and thereby the wire hook pin elements 165A away from the wire being wound through the stator slot while rotation of the assembly 160A in a clockwise direction rotates the fingers 164A and thereby the wire hook pin elements 165A to a position under the wire as the shuttle 125 has reached the extreme left position. This operation will be explained more in detail later with reference to FIGURES 11 and 12.

The bearing for rotation of the assembly 160A is the bearing member 157 (FIGURE 3) while the link 364 is supported in a groove in a mounting plate 371 (FIGURE 6) so as to allow for smooth lateral operation of the wire hook finger assembly 160A. The actuating pin 366 is slidably mounted in a hole in one end of the link 364 to permit the lateral operation of the wire hook finger assembly 160A.

In the preceding description of the several operating parts of the machine no attempt has been made to tie in the timing in the various operations which is described hereinafter under the heading "Description of Operation."

Description of operation

Before machine winding the stator unit 24, the unit has to be rotated in the stator nest assembly 25 to a definite adjusted position, as shown in FIGURES 8, 9 and 10. The stator nest assembly is comprised of the following parts indicated by the corresponding numerals:

26—stator nest
39—index collar
29—gear
400—bearing
402—spring for stator slide pin
404—stator slide pin
406—cam pin
408—retainer screw
410—wire fastening pins
412—wire guide pins
28—gear mounting screws The stator unit 24 is placed in the bore of the stator nest 26 and located on a suitable indexing fixture so that the surfaces of the stator unit 24 are approximately flush with surfaces of the stator nest 26. The stator unit 24 is then rotated so that a predetermined slot, for example, slot III in the stator unit 24, lines up with a scribed line 414, shown in FIGURE 10, and thereby with the center point of the index hole 56 in index collar 39, shown in FIGURE 8, as well as the left edge of a wire guide pin 412 on the stator nest 26, shown in FIGURE 9. The stator unit 24 is held in index position by the camming action of the cam pin 406 on slide pin 404 when the retainer screw 408 is tightened in position, as shown in FIGURE 8.

End turn forming rings or similar end caps 420 and 422 are now attached to the stator nest 26 and stator unit or shell 24. These rings are so keyed that the same are assembled in one predetermined position only relative to stator unit 24. The stator nest assembly 25 is then assembled in the winding machine as shown in FIGURE 3. The end turn forming rings 420 and 422 may be of the type described and claimed in U.S. Patent No. 2,810,848, granted October 22, 1957, to George I. Roberts, and assigned to Bendix Aviation Corporation.

The end turn forming rings or end caps 420 and 422 each have, as shown in FIGURE 8, outermost, intermediate, and innermost flanges. The innermost and intermediate flanges of the respective end caps 420 and 422 define therebetween grooves, channels or innermost wire end turn receiving zones 435 and 437 while the outermost and intermediate flanges of the respective end caps 420 and 422 define therebetween grooves, channels or outermost wire end turn receiving zones 439 and 441. Furthermore, the end caps 420 and 422, as shown in FIGURES 9 and 10, respectively are provided with radially extending slots indicated by Roman numerals I, II, III, IV, V, VI, VII, VIII, and IX adapted to register with corresponding radially extending slots in the stator unit or shell 24 to be wound, one of said end caps 420 and 422, as shown in FIGURE 8, are applied to each end of the stator unit or shell 24 to be wound with the slots in the end caps 420 and 422 in register with the corresponding slots in said stator unit or shell 24.

The described machine is designed to wind three (3) coils at one time, winding coils in stator slots III–VII, I–VI, and IV–IX, as shown in FIGURE 9. This means that there will be three (3) wire bushings 152, three (3) right wire hook fingers 164, three (3) left wire hook fingers 164A, as shown in FIGURE 3, and three (3) sets of pins 412 and 410, as shown in FIGURE 9, to effect the machine operation.

Figure 11A:
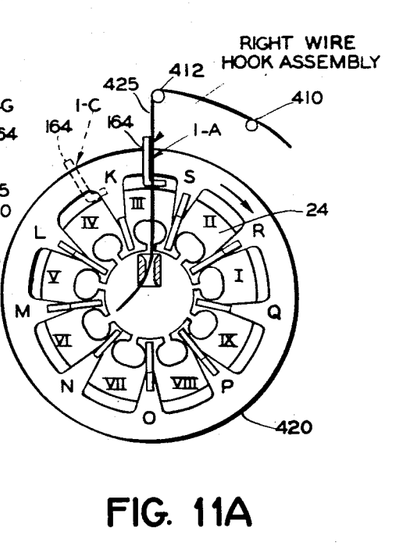
FIGURE 11A is a diagrammatic illustration of the wire end turn and hook assembly at the right hand side of the stator nest assembly of the coil winding apparatus and showing the same at the start of the winding operation and by dotted lines the step of positioning the hook assembly so as to release the wire held thereby after the wire bushing had been positioned into the bore of the stator nest assembly.
Figure 11B:
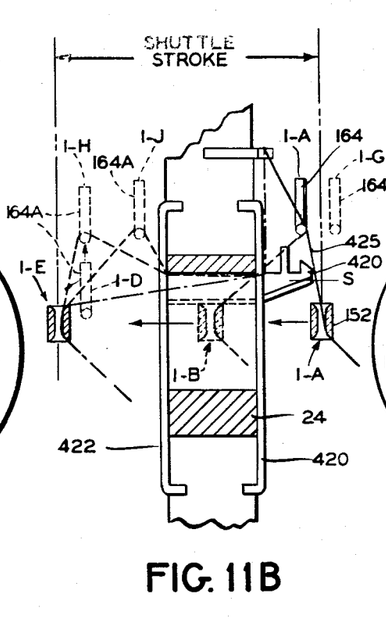
FIGURE 11B is a diagrammatic illustration showing first stages of the winding operation in which the wire bushing is positioned in successive steps through the bore of the stator nest assembly from the right hand side to the left hand side thereof, together with a showing by dotted lines of the adjusted positions taken by the associated wire hook assembly during such stages in the winding operation.
Figure 11C:
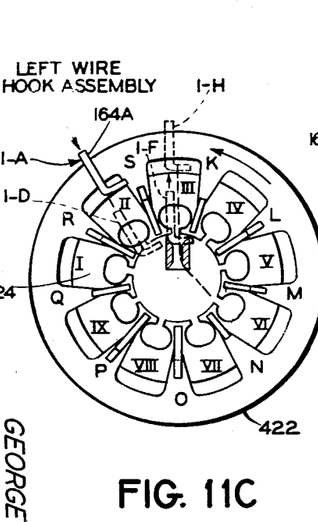
FIGURE 11C is a diagrammatic illustration of the wire end turn and associated wire hook assembly in operative relation at the left hand side of the stator nest assembly and showing by dotted lines successive steps in the positioning of the wire hook assembly to pick up the wire carried by the wire bushing after passage thereof through the bore of the stator nest assembly from the right to the left hand side.
Figure 12A:
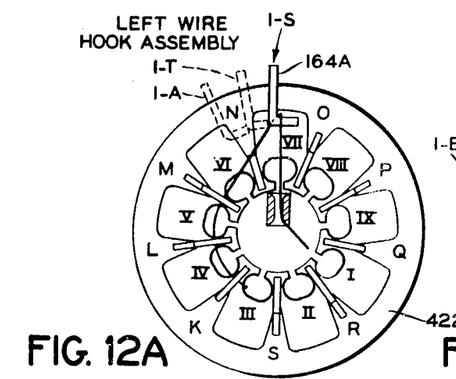
FIGURE 12A is a diagrammatic illustration of the wire end turn and hook assembly at the left hand side of the stator nest assembly after the further step of applying an oscillatory movement to the stator nest assembly and showing by dotted lines the positioning of the associated wire hook assembly so as to release the wire held thereby following a return movement of the wire bushing back into the bore of the stator nest assembly.
Figure 12B:
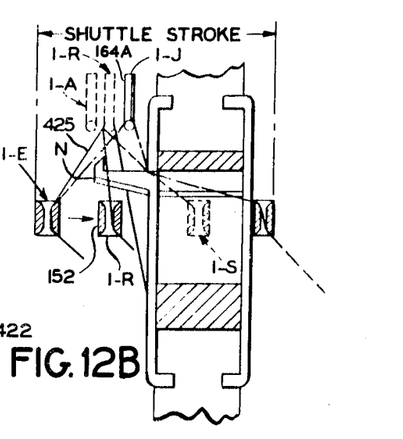
FIGURE 12B is a diagrammatic illustration of further stages in the winding operation in which the wire bushing is shown positioned in successive return steps through the bore of the stator nest assembly from the left hand side to the right hand side thereof, together with a showing by dotted lines of the adjusted positions of the associated wire hook assembly during such stages in the winding operation.
Figures 12C, 12D, 12E:
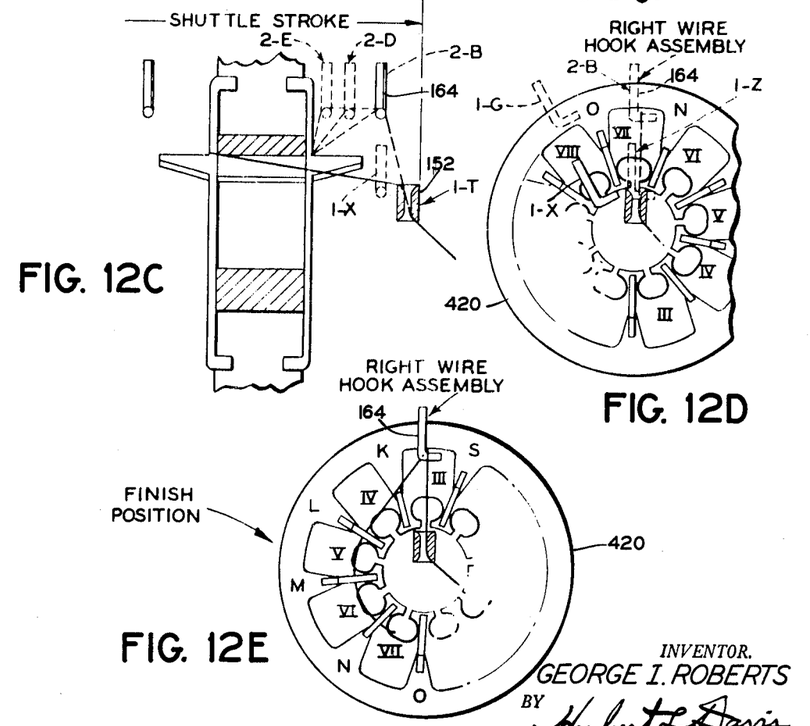
FIGURE 12C is a diagrammatic illustration showing the wire bushing after the return passage through the bore of the stator nest assembly to the right hand side thereof and by dotted lines the succeeding adjusted positions of the associated right hand wire hook assembly to pick up the wire carried by the wire bushing on the return movement thereof to the right hand side of the stator nest assembly.
FIGURE 12D is a diagrammatic illustration of the wire end turn and hook assembly at the right hand side of the stator nest assembly and showing by dotted lines the adjusted positions of the associated wire hook assembly to pick up the wire carried by the wire bushing on the return passage thereof to the right hand side of the stator nest assembly.
FIGURE 12E is a diagrammtic illustration of the wire end turn and hook assembly at the right hand side of the stator nest assembly after the final step of applying an oscillatory movement to the stator nest assembly in the completion of the winding of one turn of wire and the return of the stator nest assembly to the initial position in relation to the associated wire hook assembly of FIGURE 11A preparatory to the winding of succeeding turns of wire in a similar manner to that heretofore diagrammatically shown.

At the crossover points between slots III and IV, VI and VII and I and IX, each turn of one coil will lap over each turn of the other coil on each side of the unit 24 as the stator unit 24 is oscillated from 0 degrees to 160 degrees and returned; and in the winding of each turn of the coil on the unit 24, the unit and the associated machine members are manipulated from the starting position illustrated diagrammatically by FIGURE 11A through the positions of FIGURES 11B and 11C and by the successive positions of FIGURES 12A, 12B, 12C and 12D to the finish position of FIGURE 12E, as explained hereinafter. After the necessary turns have been wound the stator unit and associated machine members will be in the position illustrated diagrammatically in FIGURE 12E at the completion of the operation. The three (3) coils will look substantially, as shown by the drawing of FIGURE 9.

Some of the features of the operation of the machine which should be pointed out are as follows:

(1) The wire hook finger assemblies 160 and 160A arranged at opposite sides of the stator unit 24 have three (3) separate motions, mainly rotation, vertical and lateral motions. The function of these assemblies, as shown diagrammatically in FIGURES 11A to C and 12A to E, is to pick the wire 425 up after the shuttle 125 has brought the wire 425 through the slot of the stator unit 24 which together with the oscillating motion of the stator nest assembly 25, serves to lay the wire 425 in the channels, grooves or innermost wire end turn receiving zones 435 and 437 provided on the left and right end caps or end turn forming rings 420 and 422. This operation of the machine causes the coils to cross over each other to be wound as described.

(2) The wires 425 are guided and enter slots of the stator unit 24 by the movement of the shuttle cap bushing 152 from position 1-A to position 1-B of FIGURE 11B and the return movement of the bushing 152 from position 1-E to position 1-S of FIGURE 12B before the fingers 164 and 164A are rotated away from alignment with the respective slots III and VII, as shown from positions 1-A to 1-C and 1-S to 1-T, of the respective drawings of FIGURES 11A and 12A.

In the winding operation, the machine stops at the finish position shown in the drawing of FIGURE 12E after winding the three (3) coils as previously described and shown in the drawing of FIGURE 9.

It will be noted that in FIGURE 11A the right hook finger 164 is shown in its outer radial position 1-A in line with the stator slot III and angularly positioned with reference to the end turn forming ring 420 to the position 1-C to release the wire held thereby, as indicated by dotted lines in FIGURE 11A, after movement of the wire bushing 152 from the position 1-A to the position 1-B, as indicated in FIGURE 11B. The winding of three (3) additional coils at the 120 degree pitch is completed in the same manner as the three (3) coils at the 160 degree pitch except that there are no crossover turns and instead of being wound in the inner grooves or the innermost wire end turn receiving zones 435 and 437 of the forming rings 420 and 422, (3) additional coils are wound in outer grooves or the outermost wire end turn receiving zones 439 and 441 of the forming rings 420 and 422, as shown in the drawings of FIGURES 8 and 10, and hereinafter described.

In order to simplify the description of the operation of the machine, the winding of one turn only will be described with reference to schematic drawings FIGURES 11A to C and 12A to E and the machine assembly drawings FIGURES 1 through 8. The numbers on the several drawings refer to positions of the various functional elements with reference to each other. The wire indicated in FIGURES 11A, 11B and 12B by the numeral 425 and which is to be wound on the unit 24 is fed from a suitable shuttle tension device (not shown) through a longitudinal bore in the shuttle 125 and out wire bushing 152 located in the shuttle cap 150.

As shown in FIGURE 11A, the wire 425 is wound over pin 412 located in line with the stator slot number III as well as slots VI and IX, as shown in FIGURE 9, of the stator unit 24 in the stator nest 26 and an end of wire 425 in each case is fastened to pin 410. The stator nest 26 which is comprised namely of the stator unit 24, right end turn forming ring 420 and left end turn forming ring 422 is oscillated back and forth, as previously described in a predetermined timed relation with the shuttle cap 150 and wire hook fingers 164 and 164A.

The relative positions of the functional elements at the start of the operation is shown in FIGURES 11A and 11B in which the wire bushing 152 of shuttle 125 has started its stroke toward the left end and is at position 1-A (FIGURE 11B) and the wire 425 rests in the right wire hook finger 164 at position 1-A (FIGURES 11A and B), while the left wire hook finger 164A is rotated away from slot III of the processed stator unit 24 and is held in its outer diameter position 1-A (FIGURE 11C) by left vertical motion cam 220 (FIGURE 3) and laterally in position 1-A by left lateral motion cam 250 (FIGURE 3).

Further, at the start of the winding operation, the right wire hook finger 164 in position 1-A, as shown in FIGURE 11A, is in line with stator slot III, pin 412 and wire bushing 152 in position 1-A (FIGURE 11B), and the finger 164 is held in its outer diameter position 1-A (FIGURE 11A) by right vertical and lateral motion cam 180 (FIGURE 3) and laterally in position 1-A (FIGURE 11B) by right lateral motion cam 190 (FIGURE 3).

As the machine starts to operate (FIGURE 11B) the wire bushing 152 slides to the left through the bore of the stator unit 24 and at position 1-B of the bushing 152 (FIGURE 11B) the wire 425 has definitely entered slot III of the stator unit 24 at which time right wire hook finger 164 through the action of cam 310 (FIGURE 5) starts to rotate away from position 1-A toward position 1-C (FIGURE 11A). This operation when complete will allow wire 425 which was over wire hook finger pin element 165 to be free thereof. Shortly after as wire bushing 152 continues through the bore of the stator unit 24 toward the position 1-E (FIGURE 11B) the left wire hook finger 164A starts to drop from position 1-A (FIGURE 11C) to position 1-D. The left wire hook finger 164A reaches its lower position 1-D of FIGURE 11C and starts to rotate 5 degrees through the action of cam 350 (FIGURE 6) before the shuttle cap 150 with wire bushing 152 reaches its extreme left position 1-E (FIGURE 11B). Timing is close, but due to the lateral position of the wire bushing 152 in reference to wire hook finger 164a there is no interference. The right wire hook finger 164 starts to move laterally away from the stator unit 24 due to action of the right lateral motion cam 190 (FIGURE 3). At position 1-C the right hook finger 164 (FIGURE 11A) has rotated completely away from wire 425 and thereafter proceeds to the extreme right position 1-G (FIGURE 11B) in the course of the operation of the machine.

The wire 425 has now been guided into slot III of stator unit 24 and 5 degrees before the wire bushing 152 reaches its extreme left position 1-E (FIGURE 11C) the left wire hook finger 164A at position 1-D (FIGURE 11C) through the action of cam 350 starts to rotate in a clockwise direction to a position 1-F (FIGURE 11C) under wire 425 and in line with slot III of the stator unit 24. At the same time at position 1-D (FIGURE 11C) the left hook finger 164A has reached its lower position. At position 1-E (FIGURE 11B) the wire bushing 152 has reached its extreme left position while at such time the right wire hook finger 164 has moved to the extreme right position 1-G (FIGURE 11B).

At position 1-F (FIGURE 11C) the left wire hook finger 164A has completed its rotation under wire 425 and left vertical and lateral motion cam 220 (FIGURE 3) starts to raise the finger 164A toward position 1-H (FIGURE 11C) and it in turn raises the wire 425. After the left hook finger 164A has reached its highest position 1-H (FIGURES 11B and C) it starts to move laterally from position 1–H (FIGURE 11B) to the right or toward stator unit 24 to position 1–J (FIGURE 11B) and the oscillation of the stator unit 24 starts.

The lateral motion of left wire finger 164A continues toward the right from position 1–H (FIGURE 11B) to position 1–J (FIGURE 11B) at which time the stator nest assembly 25 has been oscillated by the action of the cam 75 (FIGURE 4) in a counterclockwise direction, as viewed from the left side of FIGURE 11C, so that slot IV in stator unit 24 lines up approximately with left hook finger 164A. At this time the wire 425 has been wound from pin 410 to which it is fastened (FIGURE 11A) over guide pin 412 through slot III over projection K of the plastic ring 422 (FIGURE 11C) and over the left hook finger 164A. The projection K, as shown in FIGURE 11C, has no vertical member as have projections L and M and is thus arranged so as to compensate for the crossover of coils wound in slot III–VII and IV–IX of the unit 24. Crossover occurs between slots III and IV.

With the left hook finger 164A in the position 1–J as viewed in FIGURES 11B and 12B, the oscillation of the stator nest assembly 25 continues in a counterclockwise direction with the finger 164A (FIGURE 12A) laying the wire 425 in the inner channel 437, shown in FIGURE 8, and provided in the projections L and M of the left end turn forming ring 422, as shown in FIGURE 10, until the slot VII approaches the left hook finger 164A (FIGURE 12A).

The left hook finger 164A is thereupon moved to the left from position 1–J (FIGURE 12B) to position 1–R, as shown in FIGURE 12B, by operation of the left lateral motion cam 250 (FIGURE 3) at which time rotation by the action of the cam 75 (FIGURE 4) of the stator nest assembly 25 stops with slot VII of the stator unit 24 lined up with the left hook finger 164A (FIGURE 12A) in the position 1–S (FIGURE 12A). At this time the wire bushing 152 has moved from position 1–E (FIGURE 12B) to approximately position 1–R, as shown in FIGURE 12B.

The wire bushing 152 continues to move toward the right and at position 1–S of the wire bushing 152 (FIGURE 12B) the left hook finger 164A by the action of cam 350 (FIGURE 6) starts to rotate away from the wire 425 which at this point 1–S (FIGURE 12A) is over it to a position 1–T (FIGURE 12A) thereby dropping the wire 425. The right hook finger 164 in turn starts to drop from position 1–G (FIGURES 11B and 12D) toward position 1–X (FIGURES 12C and 12D) as the wire bushing 152 continues to move toward the right from the position 1–S (FIGURE 12B) to position 1–T (FIGURE 12C) and left wire hook finger 164A has rotated from position 1–S (FIGURE 12A) to approximately position 1–T away from wire 425, as shown in FIGURE 12A.

The wire 425 now has been wound through slot III (FIGURE 11A) of the stator unit 24 and over projections K, L, M and N (FIGURE 12A) and through slot VII of the stator unit 24 (FIGURE 12C). Thereafter, the left lateral motion cam 250 (FIGURE 3) moves the left hook finger 164A further to the left from position 1–R (FIGURE 12B) to position 1–A and counterclockwise rotation of the finger 164A by the action of cam 350 from position 1–T (FIGURE 12A) is completed at position 1–A (FIGURE 12A). On the other hand, the right wire hook finger 164 is dropped from the position 1–G (FIGURE 12D) to the position 1–X (FIGURE 12D) 5 degrees before the shuttle 125 or wire bushing 152 has reached its extreme right position 1–T, as shown in FIGURE 12C. There is no interference due to the lateral positions of each element (FIGURES 12C and D). Also, at this time right hook finger 164 by the action of cam 310 (FIGURE 5) starts to rotate from position 1–X (FIGURE 12D) to a position 1–Z (FIGURE 12D) under the wire 425 and in line with slot VII of the stator unit 24.

Thereafter, the right vertical and lateral motion cam 180 starts to raise finger 164 from position 1–Z (FIGURE 12D to position 2–B (FIGURES 12C and D). At position 2–B (FIGURE 12D) the right vertical and lateral motion cam 180 (FIGURE 3) has raised the right hook finger 164 to its highest position and the oscillating cam 75 starts to rotate the stator nest assembly 25 in a counterclockwise direction as viewed in FIGURE 12D back to the original position of FIGURE 12E.

Upon the raising of the finger 164 from the position 1–Z (FIGURE 12D) to the position 2–B (FIGURES 12C and 12D) the wire 425 is lifted with the finger 164. Thereafter, the motion of the right wire hook finger 164 due to the motion of the right vertical and lateral motion cam 180 (FIGURE 3) continues toward the left from position 2–B (FIGURE 12C) to position 2–D (FIGURE 12C) at which time the stator nest assembly 25 has been oscillated so that slot VI of stator unit 24 lines up approximately with the right hook finger 164. At this time the wire 425 has been wound through stator slot III (FIGURES 11A and 11B) over projections K, L, M and N (FIGURE 12A) on left ring 422 back through slot VII (FIGURES 12A and B) over projection N of the right ring 420 (FIGURE 12E) and over right hook finger 164. The projection N has no vertical member as have projections L and M and is so arranged as to permit crossover of coils wound in slots at III–VII and VI–I. Crossover occurs between slots VI and VII of the stator unit 24.

The lateral movement of the right wire finger 164 continues from position 2–D (FIGURE 12C) toward the left to position 2–E (FIGURE 12C) and with the right finger 164 in the position 2–E, as viewed in FIGURE 12C, the oscillation of the stator nest assembly 25 as viewed in FIGURE 12D continues in a counterclockwise direction with the finger 164 laying the wire 145 in the inner channel 435, shown in FIGURE 8, and provided in the projections L and M of the right end turn forming ring 420, as shown in FIGURE 9, until the slot III approaches the right hook finger 164 as viewed in FIGURE 12E.

The right hook finger 164 is now moved from position 2–E of FIGURE 12C towards the right away from unit 24 to a position 1–A (FIGURE 11B) by right lateral motion cam 190 (FIGURE 3), at which time rotation of the stator nest assembly 25 stops and slot III again lines up with the right hook finger 164 and at this time the wire bushing 152 has also moved to the left approximately to the position 1–A, as shown in FIGURE 11B.

The wire 425 has now been wound through slot III over projections on the left ring 422 back through slot VII over projections on the right ring 420 and the winding machine is ready for re-entrance of the wire 425 into slot III again. The balance of turns specified for this coil are wound in stator slots III and VII in exactly the same manner as the first turn previously described.

In order to wind the three (3) additional coils in the stator unit 24 at the specified 120 degree pitch the following manual adjustment of the winding machine must be made:

(1) Change the stator oscillating mechanism from 160 degrees to 120 degrees oscillation by removing the thumb nut 110 (FIGURE 1) and sliding the bracket 112 so that cam 76 is brought into operation in place of the cam 75, as heretofore described.

(2) Change both left and right vertical and lateral motion cams 220 and 250 (FIGURE 6), and 180 and 190 (FIGURE 5) by releasing latches 280 and 285 and pushing rods 291 and 293 connected to brackets 295 and 297 so that cams 270, 272, 274 and 276 are brought into operation as previously described.

(3) Disengage oscillating drive gear 31 by pushing or sliding the plate 115, as shown in FIGURE 3, toward the right and rotating the stator nest assembly 25 in a counterclockwise direction so that the slot VIII lines up with the wire hook finger 164 instead of slot III. Re-engage the oscillating drive gear 31 by releasing plate 115 and the machine is thereupon ready to wind the three (3) 120 degree pitch coils. It will be noted that as the stator nest assembly 25 and end turn forming ring are rotated, the wire will wind (FIGURE 8) in the outer groove 439 of forming ring 420 and in the outer groove 441 of forming ring 422.

The winding of the three (3) 120 degree pitch coils is completed in the same manner as the three (3) 160 degree pitch coils, except that there are no crossover windings and the 120 degree pitch coils are wound in the outer groove of the forming rings 420 and 422, as shown on the drawing of FIGURE 10.

The stator unit 24 has now been completely wound and the ends of the coils are fastened by pins similar to 410 on the stator nest 26. The stator nest assembly 25 with wound stator unit 24 is now removed from the machine. A wedge plug is then inserted in the stator unit 24.

While the coil winding method of the present invention is illustrated as applied in a mechanism applicable for the winding of a straight slot stator or rotor unit, it will be readily apparent that by changing the relative motion of the shuttle 125 and stator nest assembly 25 to a rotative and lateral motion by appropriate modification of the control cam mechanisms the mechanism and method may be applied to the winding of such a unit having skew slots.

Although the invention has been illustrated and described as applied to a single form of mechanism, various changes in the form and relative arrangements of the parts of the mechanism, which will now appear to those skilled in the art may be made without departing from the scope of the invention. Reference is, therefore, to be had to the appended claims for a definition of the limits of the invention.

What is claimed is:

1. A method of winding coils of wire in a device having a central bore and a plurality of slots opening at opposite ends of the device and into the bore of the device, said device having end turn forming ring members at opposite ends of the device with a central bore coaxial to the central bore of the device and each of said ring members having portions extending endwise in planes parallel and adjacent to each of the slots of said device, said portions having innermost, intermediate, and outermost flanges, an inner groove formed by the innermost and the intermediate flanges and an outer groove formed by the intermediate and outermost flanges; said method comprising the steps of passing a loop of wire through the bore of the device from one end of the device to the opposite end thereof and in alignment with the opening of a first selected slot in the device, lifting the wire at the opposite end of the device so that a portion of the wire is deposited along the first selected slot in the device and relative to the ring member at said opposite end and to such an extent that another portion of the wire may be deposited in the inner groove of the ring member at said opposite end upon rotation of said device relative thereto, rotating the device relative to the last-mentioned lifted wire so that said other portion of the wire is deposited in the inner groove of the ring member at said opposite end, stopping the rotation of the device upon the lifted wire being at a position adjacent the open end of a second selected slot in the device, passing a portion of the wire back through the bore in the device in alignment with the opening of the second slot into the bore of the device and releasing the lifted wire at said opposite end of the device so that the wire is deposited in the second slot, lifting the wire at the one end of the device and relative to the ring member at said one end and to such an extent that another portion of the wire may be deposited in the inner groove of the ring member at said one end upon rotation of said device relative thereto, rotating the device relative to the last-mentioned lifted wire so that the wire is deposited in the inner groove of the ring member at said one end until the lifted portion of the wire is adjacent the open end of the first selected slot and repeating the aforementioned steps for a predetermined number of windings of a first coil; thereafter passing a loop of wire through the bore of the device from one end of the device to the opposite end thereof and in alignment with the opening of a third selected slot in the device, lifting the wire at said opposite end of the device so that a portion of the wire is deposited along the third selected slot of the device and relative to the ring member at said opposite end and to such an extent that another portion of the wire may be deposited in the outer groove of the ring member at said opposite end upon rotation of said device relative thereto, rotating the device relative to the last-mentioned lifted wire so that the wire is deposited in the outer groove of the ring member at said opposite end, stopping the rotation of the device upon the lifted wire being at a position adjacent the open end of a fourth selected slot in the device, passing the wire back through the bore in the device in alignment with openings of the fourth slot and releasing the lifted wire at said opposite end of the device so that the wire is deposited in the fourth selected slot, lifting the wire at the one end of the device and relative to the ring member at said one end and to such an extent that another portion of the wire may be deposited in the outer groove of the ring member at said one end upon rotation of said device relative thereto, rotating the device relative to the last-mentioned lifted wire so that the wire is deposited in the outer groove of the ring member at said one end until the lifted portion of the wire is adjacent the open end of the third selected slot, releasing the lifted wire and repeating the aforementioned steps for a predetermined number of windings of a second coil.

2. A method of winding a plurality of coils of wire in a device having a central bore and a plurality of slots opening at opposite ends of the device and into the bore of the device, and said device having end turn forming ring members with a central bore coaxial to the central bore of the device, and each of said ring members having portions extending endwise in planes parallel and adjacent to each of the slots of said device, said portions having flanges forming a groove therein; said method comprising the steps of passing wires through the bore of the device from one end of the device to the opposite end thereof and in alignment with openings of selected slots in the device, lifting the wires at the opposite end of the device so that portions of the wires are deposited in the selected slots in the device and relative to the ring member at said opposite end and to such an extent that other portions of said wires may be deposited in the groove of the ring member at said opposite end upon rotation of said device relative thereto, rotating the device relative to the last-mentioned lifted wires so that the other portions of the wires are deposited in the groove of the ring member at said opposite end, stopping the rotation of the device upon the lifted wires being at a position adjacent open ends of other selected slots in the device, passing portions of each of the wires over one of the previously deposited wires and then back through the bore in the device in alignment with openings of the other slots, releasing the lifted wires at said opposite end of the device so that the wires are deposited in the respective other selected slots, lifting the wires at said one end of the device and relative to the ring member at said one end and to such an extent that other portions of said wires may be deposited in the groove of the ring member at said one end upon rotation of said device relative thereto, rotating the device relative to the last-mentioned lifted wires so that each of the wires pass over one of the previously deposited wires and then are deposited in the groove of the ring member at said one end until lifted portions of said wires are adjacent open ends of the first-mentioned selected slots, releasing the lifted wires and thereafter repeating the aforementioned steps for a predetermined number of windings of said coils.

3. A method of winding a plurality of coils of wire in a device having a central bore and a plurality of slots opening at opposite ends of the device and into the bore of the device, said device having end turn forming ring members at opposite ends thereof with a central bore coaxial to the central bore of the device, and each of said ring members having portions extending endwise in planes parallel and adjacent to each of the slots of said device, said portions having innermost, intermediate, and outermost flanges, an inner groove formed by the innermost and the intermediate flanges and an outer groove formed by the intermediate and the outermost flanges; said method comprising the steps of passing wires through the bore of the device from one end of the device to the opposite end thereof and in alignment with openings of a first set of selected slots in the device, lifting the wires at the opposite end of the device so that portions of the wires are deposited in the first set of selected slots in the device and relative to the ring member at said opposite end and to such an extent that other portions of said wires may be deposited in the inner groove of the ring member at said opposite end upon rotation of said device relative thereto, rotating the device relative to the last-mentioned lifted wires so that the wires may be deposited in the inner groove of the ring member at said opposite end, stopping the rotation of the device upon the lifted wires being at a position adjacent open ends of a second set of selected slots in the device, passing portions of each of the wires over one of the previously deposited wires and then back through the bore in the device in alignment with openings of the second set of slots and releasing the lifted wires at said opposite end of the device so that the wires are deposited in the respective second set of selected slots, lifting the wires at said one end of the device and relative to the ring member at said one end to such an extent that other portions of said wires may be deposited in the inner groove of the ring member at said one end upon rotation of said device relative thereto, rotating the device relative to the last-mentioned lifted wires so that each of the wires pass over one of the previously deposited wires and then may be deposited in the inner groove of the ring member at said one end until lifted portions of said wires are adjacent open ends of the first set of selected slots, releasing the lifted wires and thereafter repeating the aforementioned steps for a predetermined number of windings of a first group of coils; thereafter passing wires through the bore of the device from one end of the device to an opposite end thereof and in alignment with openings of a third set of selected slots in the device, lifting the wires at said opposite end of the device so that portions of the wires are deposited in the third set of selected slots in the device and relative to the ring member at said opposite end and to such an extent that other portions of said wires may be deposited in the outer groove of the ring member at said opposite end upon rotation of said device relative thereto, rotating the device relative to the last-mentioned lifted wires so that the wires may be deposited in the outer groove of the ring member at said opposite end, stopping the rotation of the device upon the lifted wires being at a position adjacent open ends of a fourth set of selected slots of the device, passing portions of each of the wires back through the bore in the device in alignment with openings of the fourth set of slots and releasing the lifted wires at said opposite end of the device so that the wires are deposited in the respective fourth set of selected slots, lifting the wires at said one end of the device and relative to the ring member at said one end and to such an extent that other portions of said wires may be deposited in the outer groove of the ring member at said one end upon rotation of said device relative thereto, rotating the device relative to the last-mentioned lifted wires so that each of the wires may be deposited in the outer groove of the ring member at said one end until lifted portions of said wires are adjacent open ends of the third set of selected slots, releasing the lifted wires and repeating the aforementioned steps for a predetermined number of windings of a second group of coils.

4. A method of winding an electrical apparatus shell having a plurality of equally spaced radially extending slots therein which comprises providing a pair of similar end turn forming end caps with a central bore coaxial to the central bore of the device having portions extending endwise in the planes parallel to and intermediate the slots of said device, said portions having outermost, intermediate and innermost flanges which define outermost and innermost wire end turn receiving zones, said caps being provided with radially extending slots which are adapted to register with the slots in a shell to be wound; applying one of said caps to each end of the shell to be wound with the slots in said end caps in register with the slots in said shell, moving winding wire back and forth through said shell and said end caps thereon in a fixed path with a dwell in the movement thereof beyond each of said end caps, inserting the wire in one slot of a selected pair of shell slots during the movement of the wire in one direction, inserting the wire in the other slot of said selected pair of shell slots during the movement of the wire in the opposite direction, rotating said shell in one direction through a predetermined angle during the dwell in the movement of the wire adjacent one end cap and rotating said shell in an opposite direction through said angle during the dwell in the movement of the wire adjacent the other end cap, whereby first one and then the other slot of said selected pair of shell slots are alternately brought into register with said fixed path until a predetermined number of loops of said wire have been wound into said selected pair of said shell slots, lifting portions of said winding wire during the dwell in the movement thereof beyond each of said end caps and to such an extent that end sections of said loops are disposed in the innermost zones of said end caps between the intermediate and innermost flanges thereof during the rotating of said shell in said one direction and in said opposite direction, and thereafter winding loops of winding wire in another selected pair of said shell slots in a like manner, and lifting other portions of the last-mentioned winding wire during the dwell in the movement thereof beyond each of said end caps and to such an extent that end sections of the last-mentioned loops of wire are disposed in the outermost zones of said end caps between the outermost and intermediate flanges thereof during the rotation of said shell in said one direction and in said opposite direction.

5. A method of winding an electrical apparatus shell having a plurality of equally spaced radially extending slots therein which comprises providing a pair of similar end turn forming end caps with a central bore coaxial to the central bore of the device having portions extending endwise in the planes parallel to and intermediate the slots of said device, said portions having outermost, intermediate and innermost flanges which define outermost and innermost wire end turn receiving zones, said caps being provided with radially extending slots which are adapted to register with the slots in a shell to be wound; applying one of said caps to each end of the shell with the slots in said end caps in register with the slots in said shell, moving winding wire back and forth through said shell and said end caps thereon in a plurality of straight paths with a dwell in the movement thereof beyond each of said end caps, alternately rotating said shell in one direction to bring said paths and one slot of each of selected pairs of shell slots into register with each other and then rotating said shell in an opposite direction to bring said paths and the other slot of each of said selected pairs of shell slots into register with each other during the dwells in the movement of said wire, inserting said wire into one slot of each of said selected pairs of shell slots during the movement of said wire in one direction and inserting said wire in the other slot of each of said selected pairs of shell slots during the movement of said wire in an opposite direction until a predetermined number of loops of wire have been wound into said selected pairs of slots, lifting portions of said winding wire during the dwell in the movement thereof beyond each of said end caps and to such an extent that end sections of said loops are disposed in the innermost zones of said end caps between the innermost and intermediate flanges thereof during the rotating of said shell in said one direction and in said opposite direction, and thereafter winding loops of winding wire in other selected pairs of shell slots in a like manner, and lifting other portions of the last-mentioned winding wire during the dwell in the movement thereof beyond each of said end caps and to such an extent that end sections of the loops of wire are disposed in the outermost zones of said end caps between the intermediate and outermost flanges thereof during the rotating of said shell in said one direction and in said opposite direction.

6. A method of winding an electrical apparatus shell having a plurality of equally spaced radially extending slots therein which comprises providing a pair of similar end turn forming end caps with a central bore coaxial to the central bore of the device having portions extending endwise in the planes parallel to and intermediate the slots of said device, said portions having outermost, intermediate and innermost flanges which define outermost and innermost wire end turn receiving zones, said caps being provided with radially extended slots which are adapted to register with the slots in a shell to be wound; applying one of said caps to each end of the shell to be wound with the slots in said end caps in register with the slots in said shell, moving winding wire back and forth through said shell and the end caps thereon in a plurality of straight paths with a dwell in the movement thereof beyond each of said caps, alternately rotating said shell in one direction to bring each of said paths and first one slot of each of a plurality of selected pairs of slots into register with each other and then rotating said shell in an opposite direction to bring each of said paths and the other slot of each of said plurality of selected pairs of slots into register with each other during the dwells in the movement of the wire, simultaneously inserting said wire into said one slot of each of said plurality of selected pairs of slots during the movement of the wire in one direction, simultaneously inserting said wire into said other slot of each of said plurality of said selected pairs of slots during the movement of the wire in the opposite direction, until a predetermined number of loops of wire have been simultaneously wound into each of said plurality of selected pairs of shell slots, lifting portions of said winding wire during the dwell in the movement thereof beyond each of said end caps and to such an extent that end sections of said loops of wire are disposed in the innermost zones of said end caps between the innermost and intermediate flanges thereof during the rotating of said shell in said one direction and in said opposite direction, and thereafter simultaneously winding a plurality of loops of winding wire in another plurality of selected pairs of shell slots in a like manner, and lifting other portions of the last-mentioned winding wire during the dwell in the movement thereof beyond each of said end caps and to such an extent that end sections of the last-mentioned loops are disposed in the outermost zones of said end caps between the intermediate and outermost flanges of said end caps during the rotating of said shell in said one direction and in said opposite direction.

7. A method of winding an electrical apparatus stator shell having a plurality of equally spaced radially extending slots therein which comprises providing a pair of similar end turn forming end caps with a central bore coaxial to the central bore of the device having portions extending endwise in the planes parallel to and intermediate the slots of said device, said portions having flanges which define outermost and innermost wire end turn receiving zones, said caps being provided with radially extended slots which are adapted to register with the slots in a shell to be wound; applying one of said caps to each end of the shell to be wound with the slots in said end caps in register with the slots in said shell, moving winding wire back and forth through said shell and the end caps thereon in a plurality of straight paths with a dwell in the movement thereof beyond each of said caps, alternately rotating said shell in one direction to bring each of said paths and first one slot of each of a plurality of selected pairs of slots into register with each other and then rotating said shell in an opposite direction to bring each of said paths and the other slot of each of said plurality of selected pairs of slots into register with each other during the dwells in the movement of the wire, simultaneously inserting said wire into said one slot of each of said plurality of selected pairs of slots during the movement of the wire in one direction, simultaneously inserting said wire into said other slot of each of said plurality of said selected pairs of slots during the movement of the wire in the opposite direction, until a predetermined number of loops of wires have been simultaneously wound into each of said plurality of selected pairs of shell slots, lifting portions of said winding wire during the dwell in the movement thereof beyond each of said end caps and to such an extent that end sections of said loops of wire are disposed in one of the zones of said pair of wire end turn receiving zones in each of said end caps during the rotating of said shell in said one direction and in said opposite direction, and thereafter simultaneously winding a plurality of loops of winding wire in another plurality of selected pairs of shell slots in a like manner, and lifting other portions of the last-mentioned winding wire during the dwell in the movement thereof beyond each of said end caps and to such an extent that end sections of the last-mentioned loops are disposed in the other zone of said pair of wire end turn receiving zones in each of said end caps during the rotating of said shell in said one direction and in said opposite direction.

References Cited by the Examiner

UNITED STATES PATENTS

| | | | |
|---|---|---|---|
| 2,304,520 | 12/1942 | Wirtz et al. | 242—1.1 |
| 2,624,518 | 1/1953 | Scofield et al. | 242—1.1 |
| 2,647,696 | 8/1953 | Brunand | 242—1.1 |
| 2,723,804 | 11/1955 | Martin | 242—1.1 |
| 2,810,848 | 10/1957 | Roberts | 310—260 |
| 2,952,069 | 9/1960 | Young | 29—155.5 |

FOREIGN PATENTS

| | | |
|---|---|---|
| 710,366 | 9/1941 | Germany. |
| 563,932 | 9/1944 | Great Britain. |
| 568,733 | 4/1945 | Great Britain. |

WHITMORE A. WILTZ, *Primary Examiner.*

JOHN F. CAMPBELL, *Examiner.*